June 14, 1938. S. COLLIER 2,120,548
PLUG INSERT FOR FRICTION ELEMENT AND METHOD OF MAKING THE SAME
Filed Jan. 29, 1935
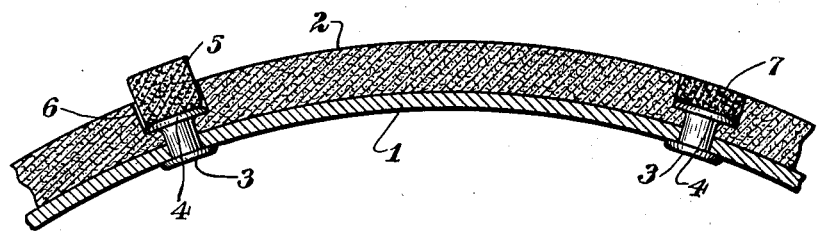
INVENTOR.
Simon Collier.
BY D. N. Halstead.
ATTORNEY.

Patented June 14, 1938

2,120,548

UNITED STATES PATENT OFFICE 2,120,548

PLUG INSERT FOR FRICTION ELEMENT AND METHOD OF MAKING THE SAME

Simon Collier, Waukegan, Ill., assignor to Johns-Manville Corporation, New York, N. Y., a corporation of New York Application January 29, 1935, Serial No. 3,903

3 Claims. (Cl. 188—251)

This invention relates to a plug insert for a friction element and to the method of making the same.

The countersinking of holes in automobile brake lining, clutch facing and the like, and the insertion of rivets or bolts through such countersunk holes, to secure the friction element to a supporting member, is quite common. Also, it is generally known that dirt, particles of grit, or abraided metal collect in such countersunk holes during use of the friction element and cause the scoring of brake drums. Difficulties have been encountered in providing satisfactory means of excluding this collection of undesirable material from the countersunk holes. Under other conditions, the holes, by reducing the area of frictional engagement, cause the drums during use to show pronounced ridging following the lines of the rivet holes.

There have been made heretofore friction elements having plugs inserted thereinto. Sometimes these plugs have been maintained, by separators, as insertions that are discrete and are not united directly to the friction element. In other instances, the insertions have been constituted of material of coefficient of friction widely different from that of the friction element. Thus, there have been used cork inserts and also plugs constituting reservoirs for lubricants.

It is an object of the present invention to provide a friction element provided with countersunk rivet or bolt holes or the like, and means for closing such holes, while maintaining the desired frictional characteristics and contour of the surface of the said element. Another object is to provide a plug of readily deformable composition adapted to be inserted into the countersunk hole in the friction element, to be shaped to conform closely to the wall thereof, and to be surface polished and then hardened at an elevated temperature during use of the finished assembly. Other objects and advantages will appear from the detailed description that follows.

A preferred embodiment of the invention is illustrated in the attached drawing and will be described in connection therewith.

The drawing shows a longitudinal sectional view of a brake assembly including a supporting band 1 of metal or the like, a friction element 2 such as a bus or truck brake block of substantial thickness, and fastening elements such as the rivets 3 securing the friction element to the supporting band. Heads 4 of the rivets are seated in countersunk holes, as illustrated.

At the left in the drawing is shown a plug 5 inserted into a countersunk hole but not made integral with the wall thereof. This incomplete assembly is made by first securing the rivet in the hole and then placing the plug above the head of the rivet.

This plug 5 is readily deformable and adapted to be shaped to conform closely with the wall 6 of the hole. Also, the plug is constituted of a heat-hardenable composition adapted to have, after hardening, a high coefficient of friction, suitably approximately the same as the coefficient of the adjacent friction element or higher than the coefficient of a lubricated insert.

Thus, the plug may be composed of a composition including a large proportion of reenforcing fibrous material and a friction compound intimately associated with the reenforcing fibres. A composition suitable for the plug 5 may comprise approximately 50 parts by weight of scrap asbestos yarn and/or well dispersed asbestos fibres, approximately 15 parts by weight of unvulcanized rubber, and other ingredients that are conventional in friction compounds, as for example, finely divided solid fillers or pigments, vulcanization materials, and, preferably, a small proportion of lubricant, such as graphite.

These ingredients are thoroughly mixed, suitably in the presence of a volatile solvent for the rubber. The resulting mixture is formed into a sheet that may be of thickness equal approximately to twice the depth of the hole that is to be closed in the friction element. Then the solvent may be allowed to evaporate from the sheet to leave a compressible, somewhat spongy structure. Small cylindrical plugs may then be cut from this sheet.

In order to facilitate adherence of the plugs to the walls of the holes in the finished assembly, the plugs are suitably provided with an exterior coating of a rubber cement, the solvent component of which is allowed to evaporate largely before the plug is inserted into the hole, to produce a semiplastic mass with a tacky exterior surface adapted to become integral with the material of the wall of the hole of the friction element. If desired, the wall of the hole may be moistened with a volatile softener therefor, such as high test gasoline, of relatively low end boiling point, shortly before the plug is inserted. Another softener that may be used is benzol.

A plug 7 in final position in the brake lining or other friction element is shown at the right, in the drawing. The plug 7 is brought to the condition illustrated by suitable means, as by striking the readily deformable compressible plug 5 with a hammer. In this manner, the plug is made to conform closely with the wall of the hole and the surface of the plug is made substantially flush with the adjacent surface of the friction element. If necessary, a grinding operation is utilized to make the surfaces approximately flush with each other.

The invention is particularly adapted for use in friction elements of the type of automobile brake lining and clutch facing, this type including, besides automotive, also industrial friction materials, as, for example, those used in power shovels, rotary drilling machinery, and the like.

The assembly thus made is installed in a brake mechanism and is subjected to use. The plug 7, being in unhardened condition, is quickly polished down by contact with the surface to which the assembly is applied, as for example, by a brake drum, and thus is caused to lie almost exactly in line with the surface of the friction element. The elevated temperature resulting from friction, during use of the assembly, causes the hardening of the composition of the plug in situ, after the final polishing of the exterior surface has been effected as described. Since the compound in the friction element itself is not completely vulcanized during fabrication of the element, the said compound and plug are finally hardened simultaneously and, preferably, in substantially integral condition.

The result is a friction element having the plugs thoroughly locked in position in the holes, closing the holes with the exclusion of dirt therefrom, and not modifying undesirably the frictional characteristics of the surface of the friction element.

The details that have been given are for the purpose of illustration, not restriction. It is intended that variations within the spirit of the invention should be included within the scope of the appended claims.

What I claim is:

1. The method of closing a hole provided for introduction of a fastening element in a friction element to fasten said element to a support in assemblies of the type of automobile brakes and clutches which comprises forming a compressible heat-hardenable, semiplastic plug of friction material, inserting the plug into the hole to be closed, compressing and shaping the plug to conform to the wall of the hole, polishing the exposed surface of the plug, and subsequently hardening the material therein during use of the finished assembly as a friction element.

2. The method of closing a hole in a friction element of the type of automobile brake lining and clutch facing which comprises forming a heat-hardenable, deformable plug of friction material, moistening the wall of the hole with a volatile softener therefor, inserting the plug into the hole, causing the plug to conform to the wall of the hole, and then hardening the plug in situ.

3. The method of closing a hole provided for introduction of a fastening element in a friction element to fasten said element to a support in assemblies of the type of automobile brakes and clutches which comprises forming a compressible heat-hardenable, semiplastic plug of friction material, inserting the plug into the hole to be closed, compressing and shaping the plug to conform to the wall of the hole, and subsequently hardening the material therein during use of the finished assembly as a friction element.

SIMON COLLIER.